May 29, 1956  O. W. BOUGHTON ET AL  2,747,461
PHOTOGRAMMETRIC PROJECTION APPARATUS
Filed Nov. 4, 1953  2 Sheets-Sheet 1
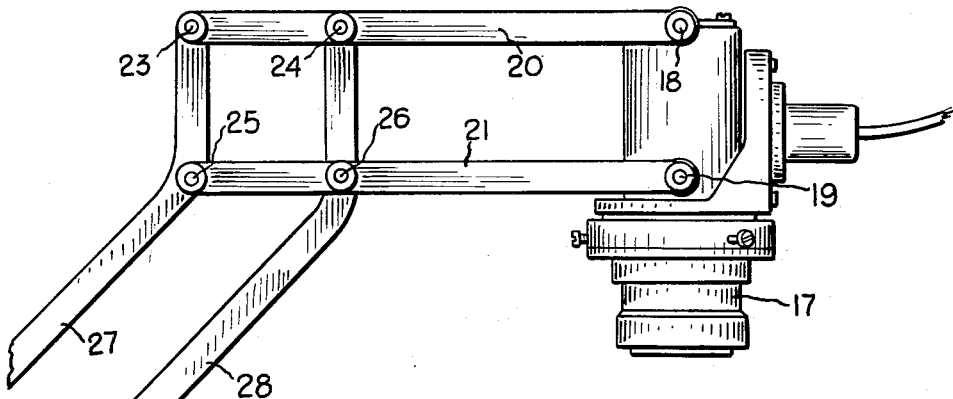
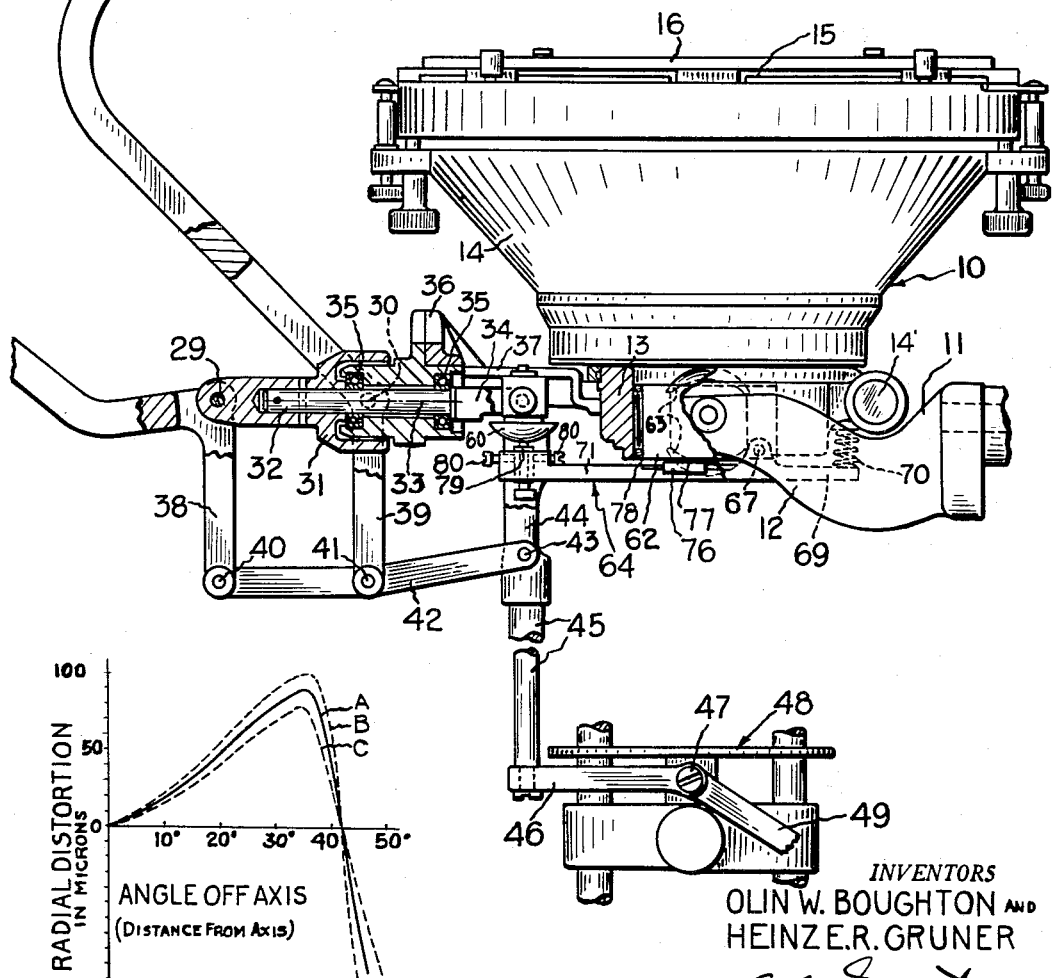
INVENTORS
OLIN W. BOUGHTON AND
HEINZ E. R. GRUNER
BY
ATTORNEY May 29, 1956 O. W. BOUGHTON ET AL 2,747,461
PHOTOGRAMMETRIC PROJECTION APPARATUS
Filed Nov. 4, 1953 2 Sheets-Sheet 2
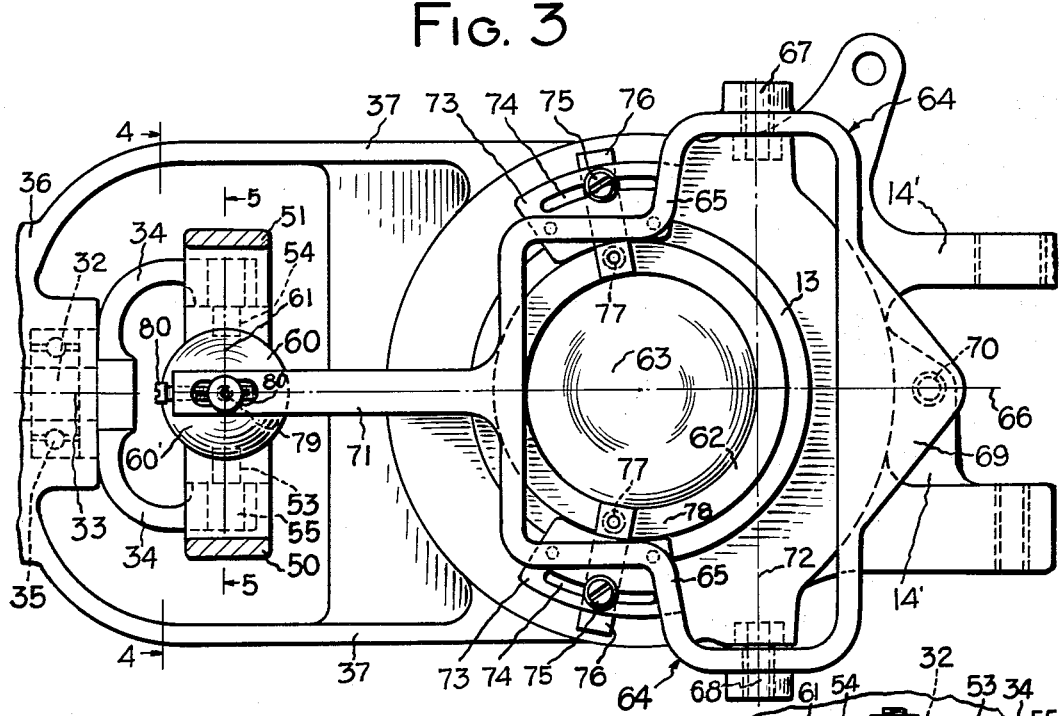
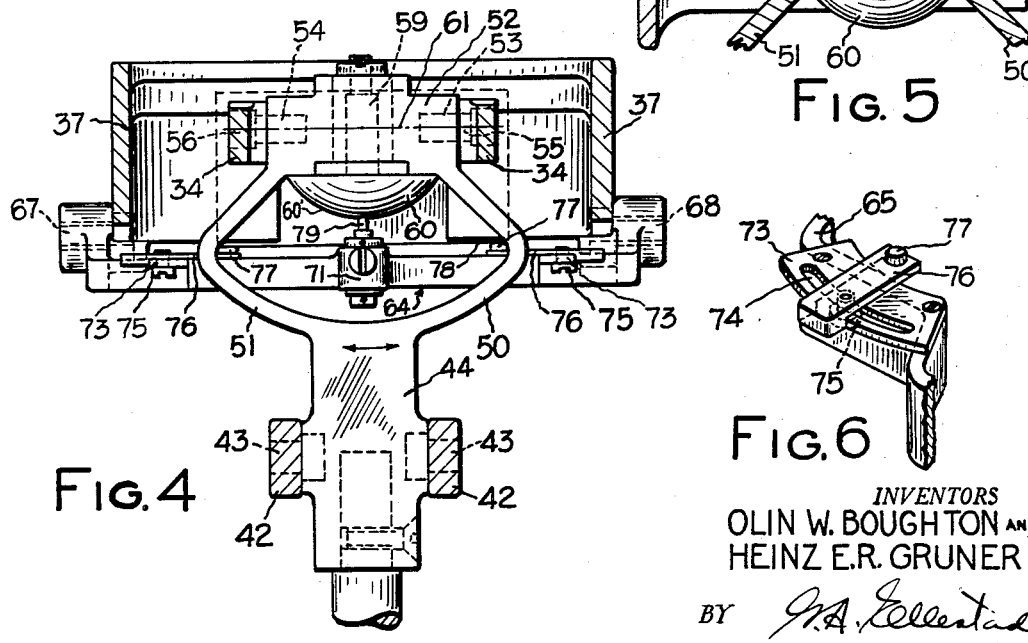
INVENTORS
OLIN W. BOUGHTON AND
HEINZ E. R. GRUNER
BY
ATTORNEY United States Patent Office 2,747,461
Patented May 29, 1956

2,747,461

PHOTOGRAMMETRIC PROJECTION APPARATUS

Olin W. Boughton, Canandaigua, and Heinz E. R. Gruner, Irondequoit, N. Y., assignors to Bausch & Lomb Optical Company, Rochester, N. Y., a corporation of New York Application November 4, 1953, Serial No. 390,129

4 Claims. (Cl. 88—24)

This invention relates to photogrammetry and more particularly it has reference to improved means in an aerial map plotter for compensating for the distortions produced by the aerial camera lens and the lens used in the plotter.

The lenses presently used in aerial cameras and in aerial map plotters have manufacturing variations in the lens surfaces that produce radial distortions in the projected images. These variations are due primarily to limitations involved in the production of the lenses. Various devices, some of which are presently on the market, have been used in an effort to overcome such distortions by providing a special compensating device for use with each separate lens unit. These prior devices are somewhat impractical since it is necessary to supply each device with a separate compensating element specially made for each lens. These compensating elements are easily lost, are inconvenient to assemble on the plotting device, and are relatively expensive to produce especially since a different compensating element is required for each particular lens.

Therefore, it is an object of this invention to overcome the above-noted disadvantages and provide an aerial map plotter having improved means for compensating for distortions introduced by the lenses.

Another object is to provide an aerial map plotter having distortion compensating means embodying a single correcting element which is used in compensating distortions for a plurality of lenses of a given type of construction.

A still further object of this invention is to provide an aerial map plotting device embodying a single compensating element and cooperating adjustment means whereby the distortion produced by any one of a group of lenses of a given type may be readily compensated.

A further object of this invention is to provide a lens compensating device that will be relatively cheap to manufacture and economical to maintain.

Other objects and advantages pertaining to the construction of the compensating device and to the form and relation of elements thereof will more readily appear from the following description taken in connection with the accompanying drawings.

Fig. 1 is a graph of a series of typical distortion curves for a particular lens formula.

Fig. 2 is a side view of a plotter showing details of the improved lens adjusting means.

Fig. 3 is a fragmentary view of the underside of the structure shown in Fig. 2 with certain parts removed.

Fig. 4 is a sectional view taken along the line 4—4 in Fig. 3.

Fig. 5 is a sectional view taken along the line 5—5 in Fig. 3.

Fig. 6 is a fragmentary view of one part of our invention.

In aerial mapping, a set of aerial photographs are taken of a particular section of the earth's surface. When the photographic information is later projected in usual photogrammetric fashion onto a map for plotting, certain deviations from the true image will be presented in the projected image. These deviations are mainly due to radial distortion in the aerial camera lens and in the projection lens.

Every type of aerial camera lens has a nominal distortion curve which is computed from the lens formula for that particular type of lens. This distortion curve is plotted on a graph with radial distortion in microns versus the angle off axis, or the distance from the axis, in degrees. Fig. 1 shows a graph of radial distortion in which curve A is a theoretical nominal distortion curve computed for a particular type of lens. In practice, it is generally not possible to consistently produce lenses having distortion curves that conform to the nominal distortion curve. Therefore, manufacturers produce lenses that vary from the nominal distortion curve between arbitrary limits set up by the trade, such as shown by the curves B and C in Fig. 1.

The distortion curve for a lens can also be derived empirically by measuring the distance between the actual projected image and the true position of this projected image that would result from distortion-free projection. The light rays from the projector subtend an angle with the axis of the lens which angle is referred to as the angle off axis or distance from the axis. The curves plotted in Fig. 1 are for a particular type of lens that has a maximum positive distortion at the off axis angle of 35°, a zero distortion at 42° and a negative distortion at 45°. The negative distortion at 45° is equal in magnitude to the aforementioned maximum positive distortion at 35°. The distortion between the projected image position and the true image position is measured in microns and the angle off axis or the distance from the axis is measured in degrees.

In known prior art devices, such as the U. S. patent to Kelsh No. 2,552,975, issued May 15, 1951, the total radial distortion for each aerial camera lens is corrected in the plotting device by using a cam member that has been specially cut for that lens. This individually cut cam member is used in a plotting device in such a way that the resulting images are substantially free of radial distortion. This system is undesirable because it is inconvenient and difficult to accurately cut a cam for each new lens and it is expensive to maintain the required cam cutting equipment.

In our invention, we are able to provide one standard cam that is adapted to correct for the nominal radial distortion for a particular type of lens, this nominal radial distortion being, for example, plotted as curve A in Fig. 1, and determined from the lens formula. This cam may be used with all lenses of the type manufactured according to the selected formula. To correct for the deviations allowed the manufacturers above and below the nominal distortion curve, such as the deviations shown by curves B and C in Fig. 1, it has been found that raising or lowering the projection lens a slight amount in addition to the raising and lowering accomplished by the standard cam will properly correct for the deviations from the nominal curve. This extra correction is accomplished by varying the effective distance between the pivot axis of the lens raising lever and its contact point on the lens barrel while holding the distance between the pivot axis of the lever and the cam constant.

Referring more particularly to Figs. 2–6 on the drawings, in which like reference numerals designate like parts, the embodiment illustrated comprises a support (not shown) having at least two identical stereoscopic projector assemblies 10, only one assembly being shown, each assembly being supported by an arm 11 having bifurcated members 12 which engage the lower portion 13 of a downwardly tapered housing 14 which has removably supported on its upper surface 15 an image bearing aerial photograph or diapositive 16. The arms 11 are mounted on the support not only to permit raising and lowering of each projector assembly 10 relative to the mapping table but also to permit lateral shifting of the projector assemblies 10 relative to each other and relative to any point on the mapping table. The projection assemblies 10 can be rotated and pivoted about the usual three axis system.

Mounted above the diapositive 16 and housing 14, in such a manner as to project rays of light always through said diapositive and housing, is the light projector 17, of conventional design, having pins 18, 19 connected, respectively, to the links 20, 21 which in turn are pivoted on pins 23, 24, 25 and 26 to light arms 27, 28. The intermediate portions of the light arms 27, 28 are pivoted by pins 29, 30 to the cap 31 which is not only pinned to shaft 32 but also rotates about the axis 33 of said shaft. The shaft 32, having bifurcated fingers 34 extending from one end, is mounted in bearings 35 in the bracket 36 which has members 37 fastened to the wall of the lower portion 13 of the housing 14. The lower portions 38, 39 of the light arms 27, 28 are pivoted at 40, 41 to link 42 which is pivoted at 43 to the forked member 44 of the telescoping rod 45 which in turn is attached to one leg 46 of a universal connection 47 on the tracing table 48. For clarity of illustration, the tracing table 48 in Fig. 2 is rotated 90° from its usual position. Normally, another projection assembly 10, not shown, would be mounted at one side of the present instrument and would have a telescoping rod (not shown) attached to the other leg 49 of the universal connection 47. As the tracing table is moved around on the mapping table, not shown, the universal connection 47 on said tracing table will permit the arms 46, 49 to be moved through any angle therewith.

The forked member 44, having the two branches 50, 51 defining an open area therebetween, terminates in a block 52 bored at 53, 54 for receiving pins 55, 56 for pivotally mounting the fingers 34 of the rotating shaft 32. Attached to the block 52 by a bolt 59 is a cam 60 which has a surface 60' formed to compensate for the nominal distortion for a particular type of lens. Extending through the center of pins 55, 56 is the axis 61 about which one end of forked member 44 and light arms 27, 28 are free to be reciprocated toward and away from the housing 14. The forked member 44 and light arms 27, 28 are free to pivot about the axis 33 of shaft 32 in a direction substantially at right angles to the aforementioned reciprocation. Therefore, when the tracing table 48 is moved in any direction on the mapping table, the light projector will be moved in the opposite direction by the light arms 27, 28 pivoting about the axis 33 and pins 29 and 30, respectively, so that a light ray from the projector will always pass through the housing and be substantially parallel to the telescoping rod 45 and its attached member 44. Since the forked member 44 carries the cam 60, both the member 44 and cam 60 will be moved together through the same path about a point at the intersection of the axis 33 of the shaft 32 and the axis 61 through the ends of the forked member 44.

Axially slidable in the lower portion 13 of the hollow housing 14 is a lens barrel or mount 62 which has fastened therein the lens 63 through which light rays from the projector 17 pass. A lever or yoke 64 has an intermediate portion adjacent the lens barrel divided into a pair of arms 65 symmetrically disposed about the longitudinal axis 66 of said lever 64. The lever 64, pivotally mounted on pins 67, 68 which project from the housing 14 into engagement with the arms 65 of the lever 64, has one end portion 69 biased away from the lower portion 13 of the housing 14 by the spring 70 which urges the other end portion 71 of the lever 64 toward both the cam 60 and the lens barrel 62. The lever 64 is adapted to pivot about the axis 72 of the pins 67, 68 which axis is disposed substantially perpendicular to the longitudinal axis 66 of the lever 64. Fastened to each arm 65 of the lever is a flange element 73 which has an arcuate slot 74 extending substantially parallel to the periphery of the lens barrel. Adjustably mounted on each flange element 73 by a cap screw 75 extending through the arcuate slot 74 into threaded engagement therewith, is a plate 76 which has on one end a contact pad 77 in engagement with the lower end portion 78 of the lens barrel 62. It is to be understood that the slot 74 may be any elongated shape and may be located in any position that will permit the contact pad 77 of plate 76 to contact the lens barrel 62 at any point along the lens barrel end portion 78.

A cam follower 79, which is inwardly adjustable through the end portion 71 of the lever 64 into contact with the surface 60' of the cam 60, has the adjusting screws 80 extending inwardly from the sides of the end portion 71 for laterally adjusting said follower 79 relative to the cam 60.

Referring particularly to Figs. 2 and 3 of the drawing, it is readily apparent that the distance from the pivot axis 72 of the lever 64 to the contact point of the follower 79 on the cam 60 is fixed. It is also apparent that the bearing length or distance from the same pivot axis 72 to the contact points of the pads 77 with the end face 78 of lens barrel 62 may be varied by moving the plates 76 substantially parallel to the longitudinal axis of the lever. Thus, in one application of our invention, a standard cam 60, cut to conform to the correction required for the nominal radial distortion for a particular type of lens, such as indicated by curve A in Fig. 1, for example, is attached to the forked member 44. If the aerial camera lens has only the nominal radial distortion, no added distortion correction aside from the standard cam correction will be needed. Therefore, the plates 76 would be fastened to the lever at the center of the elongated slot 74 so that the pads 77 would engage the lens barrel 62 at appropriate points on its face 78. In this way, as the cam is pivoted by movement of the plotting table, a standard nominal distortion correction will be transmitted to the lens 63 by the lever 64.

However, and this is the more usual case, most lenses will have manufacturing variations so that for lenses not having a nominal distortion as shown at A in Fig. 1, for example, the distortion curves will fall somewhere in the range from curve B to curve C. To correct for this deviation from the nominal distortion curve, the plates 76 are shifted to the left or right in the slot 74 an amount sufficient to provide larger or smaller amounts of axial movement to the lens 63 by the lever 64 and the standard cam 60. Therefore, the correction for radial distortion in a lens is broken down into two units, the standard correction unit plus or minus the added correction unit provided by changing the ratio of bearing length to total length of the lever. In this way, a whole group of lenses manufactured according to a selected formula within certain allowable limits can be easily corrected using only one standard correction cam.

In operation, diapositives of flat test patterns are first produced with the same camera lens which was used to photograph the terrain on the diapositives to be plotted. The test pattern diapositives are placed on the respective surfaces 15 of the projector assemblies so that images having radial distortion are projected onto the plotting table by cooperation of the projectors 17 and lenses 63. Screws 75 are loosened so that plates 76, carrying pads 77, may be moved to effect axial adjustment of the lens barrel 62. The projected images are critically examined for each adjustment of the lens barrel and when the best correction for radial distortion is attained, the plates 76 are locked in position by screws 75. The diapositives bearing the data to be plotted are then mounted on the housings 14 and the plotting proceeds in the usual manner.

Various modifications can, obviously, be made without departing from the invention as pointed out in the appended claims.

We claim:

1. In an aerial map plotter having a projection assembly comprising a housing for supporting a diapositive, a light projector movable relative to said diapositive, a lens barrel in the lower portion of said housing movable along an axis perpendicular to the plane of the diapositive, a cam connected to and movable with the light projector and shaped to partially correct the radial distortion of a lens carried by the barrel, a lever pivoted to the lower portion of the housing for moving the lens barrel, said lever having a follower for engagement with the cam, and resilient means urging the lever toward both the cam and the lens barrel to engage the follower with the cam whereby movement of the cam will control the movement of the lever in moving the lens barrel, the combination of means for adjusting the amount of axial displacement transmitted to the lens barrel by the lever comprising a plate carried by the lever, a contact pad on said plate in engagement with the lower end portion of the lens barrel, and coacting means on the lever and plate for adjustably positioning the plate along the lever in a direction substantially parallel to the axis of the lever whereby shifting the plate and contact pad on the lever will adjust the amount of axial displacement transmitted to the lens barrel.

2. In an aerial map plotter, the combination of a projection assembly having a housing for supporting a diapositive, a light projector movable relative to said diapositive, a lens barrel in the lower portion of said housing movable along an axis perpendicular to the plane of the diapositive, a cam connected to the light projector for movement therewith, said cam being shaped to partially correct for the radial distortion of a lens carried by the barrel, a lever having an intermediate portion provided with a pair of arms symmetrically disposed about the longitudinal axis of the lever, pivot means on the housing engaging the arms along an axis perpendicular to the axis of the lever, a follower carried by one end of the lever, resilient means acting on the other end of the lever for holding the follower in engagement with the cam, a plate carried by each arm of the lever, said plates having contact pads held in engagement with the lower end of the lens barrel by the resilient means, and coacting means on the arms of the lever and on the plates for adjustably positioning the plates along the lever in a direction substantially parallel to the axis of the lever, whereby shifting of the plates will vary the amount of axial displacement transmitted to the lens barrel by the lever.

3. An aerial map plotting device comprising a projection assembly having a hollow housing for supporting a diapositive, a lens barrel disposed in the lower portion of said housing movable along an axis perpendicular to the plane of the diapositive, a light projector disposed above the diapositive and movable relative thereto, a cam connected to and movable with the light projector and shaped to partially correct the radial distortion of a lens carried by the barrel, a lever having an intermediate portion adjacent the lens barrel divided into a pair of arms symmetrically disposed about the longitudinal axis of the lever, a pair of pins projecting from the housing and engaging with said arms for pivotally mounting the lever about an axis perpendicular to the longitudinal axis of the lever, a follower carried by one end of the lever, resilient means acting on the other end of the lever for holding the follower in engagement with the cam, a flange element fastened to each arm of the lever and having an arcuate slot therethrough substantially parallel to the periphery of the lens barrel, a plate on each flange, a contact pad on one end portion of each plate engaging with the lower end of the lens barrel, a cap screw extending through the arcuate slot in each flange element and threaded into the plate whereby the contact pads may be adjusted relative to the pivot axis of the lever so that shifting the contact pads along the arcuate slots will vary the amount of axial displacement transmitted to the lens barrel by the lever.

4. In an aerial map plotter, the combination of a housing for supporting a diapositive, a light projector movable relative to said diapositive, a lens barrel connected to said housing for movement along an axis perpendicular to the diapositive, a cam connected to said light projector for movement therewith, said cam having a surface shaped to partially correct for the radial distortion of a lens carried by the lens barrel, a lever pivotally mounted on the housing and having one end portion yieldably held in contact with the shaped surface of said cam, a plate carried by the lever in engagement with the lower end portion of the lens barrel, means for adjustably positioning the plate along the lever in a direction substantially parallel to the axis of the lever, whereby said plate will engage said lower end portion of the lens barrel at a different location for each position of the plate along the lever, and means for moving said projector whereby the cam surface in contact with the lever will pivot the lever for moving the lens barrel relative to the diapositive.

References Cited in the file of this patent

UNITED STATES PATENTS

| | | |
|---|---|---|
| 2,085,498 | Horner | June 29, 1937 |
| 2,492,870 | Kelsh | Dec. 27, 1949 |
| 2,552,975 | Kelsh | May 15, 1951 |
| 2,557,698 | Sharp | June 19, 1951 |
| 2,678,583 | Knapik | May 18, 1954 |